United States Patent [19]

Zwarenstein

[11] 3,794,853

[45] Feb. 26, 1974

[54] FREQUENCY DETECTION CIRCUIT

[76] Inventor: Salomon Carel Zwarenstein, Piet Heinlaan 16, Oegstgeest, Netherlands

[22] Filed: June 16, 1972

[21] Appl. No.: 263,410

[30] Foreign Application Priority Data

June 18, 1971 Netherlands .................. 7108412

[52] U.S. Cl. ............................ 307/233, 307/234

[51] Int. Cl. ........................................ H03k 5/20

[58] Field of Search .......... 307/233, 234, 271, 295; 328/133

[56] References Cited

UNITED STATES PATENTS

| | | | |
|---|---|---|---|
| 3,282,065 | 11/1966 | Flanagan | 307/233 |
| 3,259,845 | 7/1966 | Cohen | 307/233 |
| 3,268,811 | 8/1966 | Jefferson | 307/233 |
| 3,164,802 | 1/1965 | Kleist | 331/37 |
| 3,588,721 | 6/1971 | Keller | 307/233 |
| 3,564,435 | 2/1971 | Burgery | 307/233 |
| 3,391,345 | 7/1968 | Burgery | 307/233 |
| 3,270,138 | 8/1966 | Golonski | 307/233 |
| 3,225,266 | 12/1965 | Baudo | 307/233 |
| 3,170,038 | 2/1965 | Johnson et al. | 307/208 |

*Primary Examiner*—John S. Heyman
*Assistant Examiner*—Ro E. Hart
*Attorney, Agent, or Firm*—Weiner, Basile and Weintraub

[57] ABSTRACT

A frequency detection circuit having an input transistor connected to the primary winding of a coupling transformer. In the secondary winding circuit of the transformer there is connected a diode which cooperates with a parallel arrangement of a resistor and a capacitor arranged so that the current flowing through the resistor depends solely on the frequency of the input signal applied to the input transistor. The frequency detection circuit can simultaneously carry out a number of control functions in response to a corresponding number of frequencies of the input signal.

10 Claims, 5 Drawing Figures

FREQUENCY DETECTION CIRCUIT

The present invention relates to a frequency detection circuit. More particularly, the invention relates to an improvement in a frequency detection circuit in use, for instance, in a multi-channel remote-control receiver comprising an input transistor or a similar semiconductor device and a primary winding of a coupling transformer connected thereto, the secondary winding of the transformer affecting at least one further semiconductor device, the input transistor shunted by a capacitor, the coupling transformer and the further semiconductor device affected by the transformer and cooperating with a resistor and a capacitor being connected such that the current traversing the resistor depends solely on the frequency of a signal applied to the input transistor.

SUMMARY OF THE INVENTION

The present invention provides a frequency detection circuit comprising a first electronic control device having a first electrode, a second electrode and a third electrode. The frequency detection circuit also comprises a source of electrical energy having a first terminal and a second terminal, a transformer having a primary winding which includes a first terminal and a second terminal, a secondary winding having a first terminal and a second terminal, first resistive means having a first terminal and a second terminal, an input signal source having a first input terminal electrically connected to the first electrode of the first electronic control device, and having a second input terminal electrically connected to the second electrode of the first electronic control device.

The second electrode of the first electronic control device is electrically connected to the first terminal of the source of electrical energy and the third electrode of the first electronic control device is electrically connected to the first terminal of the primary winding of the transformer.

The second terminal of the primary winding of the transformer is electrically connected to the first terminal of the first resistive means. The second terminal of the first resistive means is electrically connected to the second terminal of the source of electrical energy.

The invention also includes a second electronic control device having a first electrode and a second electrode, and second resistive means having a first terminal and a second terminal.

The first terminal of the secondary winding of the transformer is electrically connected to the first electrode of the second electronic control device, the second terminal of the second electronic control device is electrically connnected to the first terminal of the second resistive means, and the second terminal of the second resistive means is electrically connected to the second terminal of the secondary winding of the transformer; whereby the electrical current flowing through the second resistive means depends solely on the frequency of an input signal applied by the input signal source to the first electronic control device.

It is an object, therefore, of the invention to provide an improvement in frequency detection circuits in the sense that it will become possible to use such a circuit to simultaneously carry out a number of control functions in accordance with a corresponding number of frequencies of the input signal of the frequency detection circuit.

To this end the improvement consists therein that the second electronic control device or further semiconductor device consists of a diode which is connected in the circuit of the secondary winding of the coupling transformer in series with the parallel arrangement of the resistor and the capacitor.

For a more complete understanding of the present invention, reference is made to the following detailed description and accompanying drawings. In the drawings, like reference characters refer to like parts throughout the several views.

DETAILED DESCRIPTION

Figure 1:
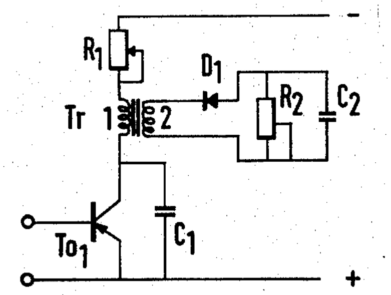
FIG. 1 shows a schematic diagram of a frequency detection circuit according to a first embodiment of the invention.

As appears from FIG. 1, the frequency detection circuit according to the invention may comprise a first electronic control device or semiconductor or transistor $To_1$, the second electrode or emitter of which is connected to the first or positive terminal of a source of electrical energy or battery (e.g., 6 volts) and the third electrode or collector of which is connected to the end of the primary winding 1 of a transformer Tr, the other end of this winding being connected to the negative terminal of the above battery through first resistive means or resistor $R_1$ which may be variable if desired.

The first electrode or base of transistor $To_1$ is connected to one of the input terminals of the circuit.

The collector of transistor $To_1$ may be connected to the positive terminal of the battery through a first capacitor $C_1$.

According to the invention, the circuit of the secondary winding 2 of the transformer Tr comprises a second electronic control device or semiconductor or diode $D_1$ in series with the parallel arrangement of a second resistive means or resistor $R_2$ (which may be variable if desired) and a second capacitor $C_2$.

The other input terminal of the frequency detection circuit is connected to the positive terminal of the battery.

Figure 2:
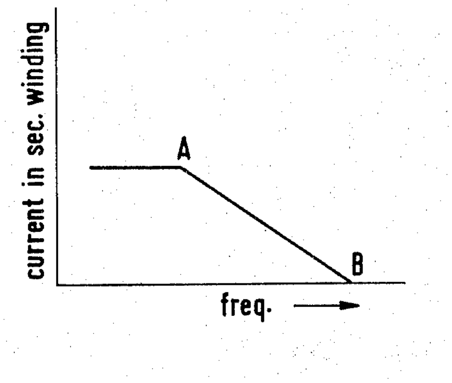
FIG. 2 shows a diagram representing the relation between the current in the secondary winding of the transformer and the frequency of the input signal.

If an input signal consisting of rectangular pulses of different frequencies is applied to the frequency detection circuit, the current inducted into the secondary winding of the transformer as a result thereof will, after rectification and integration, have a maximal value at a given frequency of the input signal. When the frequency increases, this current will remain constant and then decrease to zero, as shown in FIG. 2.

It is observed that the transformer is connected such that diode $D_1$ conducts current when transistor $To_1$ is open.

Assuming for a moment that the first capacitor $C_1$ would not be present, then a large voltage surge would occur when the transistor $To_1$ is opened. At low frequencies this surge would be higher than at high frequencies. Since it is assumed, however, that the pulse and rest times are equal at all frequencies of the input signal, the total electromotive force induced would be constant for frequencies within a specific range.

If the capacitor $C_1$ is present and has a small value, its influence on the electromotive force is practically nil. This corresponds with the maximal and constant value of the induced current, as shown in FIG. 2.

If the frequency is increased, the electromotive force will decrease when the transistor $To_1$ is cut off to such a degree that the voltage surge is reduced by the hysteresis effect in the charging current of the capacitor. A further increase of the frequency will ultimately lead to elimination of the surge. Since the charging time of the capacitor is substantially equal to 3RC, the influence of the capacitor will be nil when the signal has a frequency at which the pulse width is 3RC. The capacitor will have its effect when the signal has a frequency at which the pulse width lies between 1/3RC and 3RC (in which 1/3RC is a practical minimum value). This implies that in FIG. 2, point A corresponds with 3RC and point B with 1/3RC. The relative frequency range lies between $f$ and $9f$.

Assuming that the input signal consists of a cycle of three frequency ranges, which may be independently and simultaneously varied, each one of the three servo means connected to three parallel-connected frequency detection circuits will react to the frequency range for which the relative servo means is intended. In this connection, it is observed that together the three frequency ranges lie in a range between $f$ and $9f$, as shown in FIGS. 4 and 5.

Figures 3, 4, 5:
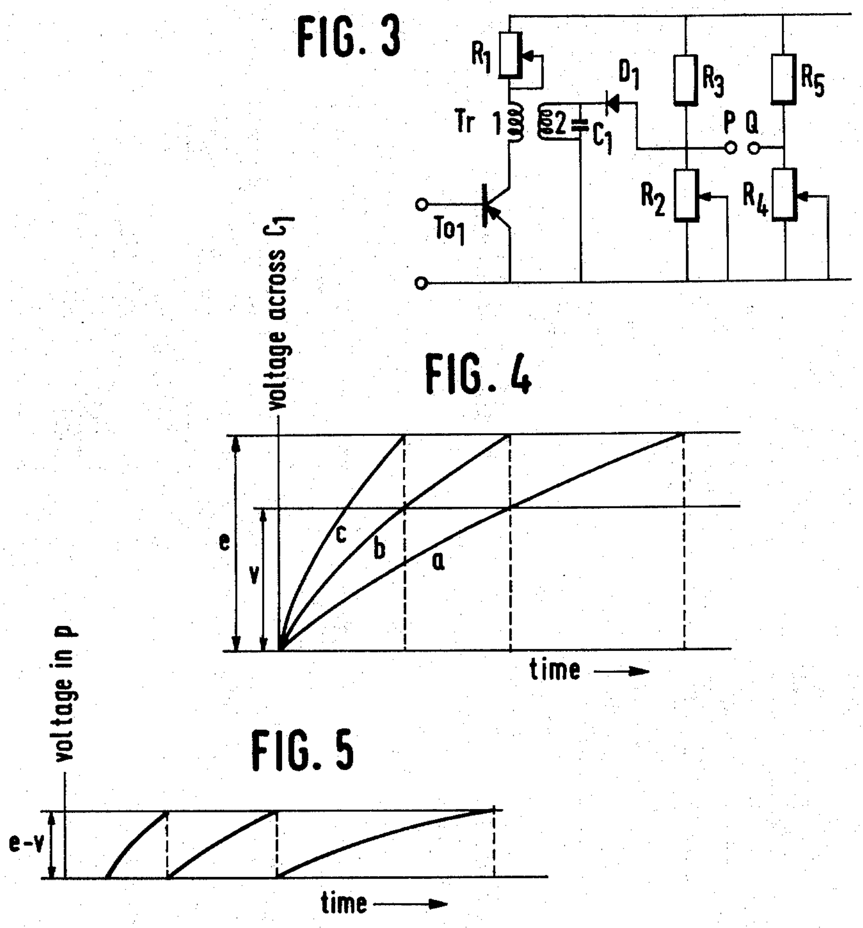
FIG. 3 shows a second embodiment of the frequency detection circuit according to the invention.
FIG. 4 shows a diagram in which the voltage across capacitor $C_1$ of FIG. 3 is plotted as a function of the time.
FIG. 5 shows a diagram showing the curves of the voltages at point P of the circuit according to FIG. 3 for three different frequencies of the input signal of the frequency detection circuit.

FIG. 3 shows a second embodiment according to the invention which substantially corresponds with that shown in FIG. 1, but in which the capacitor $C_1$ is connected in parallel to the secondary winding 2 of the transformer Tr. The junction P of diode $D_1$ and resistor $R_2$ is connected to the negative pole of the battery through third resistive means or resistor $R_3$. Furthermore, two series-connected fourth and fifth resistive means or resistors $R_4$ and $R_5$ are connected between the terminals of the battery, the junction of these resistors being indicated by Q. Points P and Q constitute the output terminals of the frequency detection circuit. Also in this case the diode $D_1$ conducts current when the transistor $To_1$ is open.

Assuming that during the cut-off interval the induced voltage is equal to $e$, as shown in FIG. 4, the build-up of the voltage across capacitor $c_1$ is effected in accordance with the curves a, b and c for three values of $C_1$.

If the voltage divider $R_2$, $R_3$ is set to a voltage v across resistor $R_2$, FIG. 5 shows the resulting curves of the voltages in point P with respect to the positive terminal of the battery for the three frequency ranges considered.

By way of illustration, the above frequency ranges may be 200–400, 400–800 and 800–1,600 Hz, respectively.

It will be clear, however, that the above case concerning three frequency ranges is chosen only by way of example and that the use of a greater number of frequency ranges is also possible.

With reference to the embodiments of FIG. 1 or FIG. 3, by connecting capacitor $C_2$ in parallel to resistor $R_2$, it is possible to use the filtering action of the RC combination, the smoothing action of the capacitor $C_2$, and the possibility of adapting the system for an optimal energy transfer to the best advantage.

It is observed that, since $C_2$ is continuously charged, the influence on $C_1$ will be small in spite of the greater value of $C_2$.

I claim:

1. A frequency detection circuit comprising, in combination:

a first electronic control device including a first electrode, a second electrode and a third electrode;

a source of electrical energy including a first terminal and a second terminal;

a transformer including a primary winding having a first terminal and a second terminal, and a secondary winding having a first terminal and a second terminal;

first resistive means including a first terminal and a second terminal;

an input signal source having a first input terminal electrically connected to said first electrode of said first electronic control device, and having a second input terminal electrically connected to said second electrode of said first electronic control device;

said second electrode of said first electronic control device being electrically connected to said first terminal of said source of electrical energy;

said third electrode of said first electronic control device being electrically connected to said first terminal of said primary winding of said transformer;

said second terminal of said primary winding of said transformer being electrically connected to said first terminal of said first resistive means;

said second terminal of said first resistive means being electrically connected to said second terminal of said source of electrical energy;

a second electronic control device including a first electrode and a second electrode;

second resistive means including a first terminal and a second terminal;

said first terminal of said secondary winding of said transformer being electrically connected to said first electrode of said second electronic control device;

said second terminal of said second electronic control device being electrically connected to said first terminal of said second resistive means; and said second terminal of said second resistive means being electrically connected to said second terminal of said secondary winding of said transformer, whereby the electrical current flowing through said second resistive means depends solely on the frequency of an input signal applied by said input signal source to said first electronic control device.

2. A frequency detection circuit according to claim 1 for use in a multi-channel remote-control receiver, wherein:

said first electronic control device comprises a first semiconductor device;

said second electronic control device comprises a second semiconductor device;

and including a first capacitor shunting said first semiconductor device;

a second capacitor shunting said second resistive means;

and wherein said second semiconductor device consists of a diode which is electrically connected in the circuit of said secondary winding of said transformer in series with the parallel arrangement of the second resistive means and said second capacitor.

3. A frequency detection circuit according to claim 1 for use in a multi-channel remote-control receiver, wherein:

said first electronic control device comprises an input transistor;

said second electronic control device comprises a semiconductor device;

said input transistor being shunted by a first capacitor;

said semiconductor device consists of a diode which is electrically connected in the circuit of said secondary winding of said transformer in series with a parallel arrangement of said second resistive means and a second capacitor;

and whereby the transformer and the diode cooperate with said second resistive means and said second capacitor connected such that the current traversing said second resistive means depends solely on the frequency of the signal applied to said input transistor.

4. A frequency detection circuit according to claim 1, including a first capacitor electrically connected between said second and third electrodes of said first electronic control device.

5. A frequency detection circuit according to claim 4, including a second capacitor electrically connected between the first and second terminals of said second resistive means.

6. A frequency detection circuit comprising, in combination:

a first electronic control device including a first electrode, a second electrode and a third electrode;

a source of electrical energy including a first terminal and a second terminal;

a transformer including a primary winding having a first terminal and a second terminal, and a secondary winding having a first terminal and a second terminal;

first resistive means including a first terminal and a second terminal;

an input signal source having a first input terminal electrically connected to said first electrode of said first electronic control device, and having a second input terminal electrically connected to said second electrode of said first electronic control device;

said second electrode of said first electronic control device being electrically connected to said first terminal of said source of electrical energy;

said third electrode of said first electronic control device being electrically connected to said first terminal of said primary winding of said transformer;

said second terminal of said primary winding of said transformer being electrically connected to said first terminal of said first resistive means;

said second terminal of said first resistive means being electrically connected to said second terminal of said source of electrical energy;

a second electronic control device including a first electrode and a second electrode;

second resistive means including a first terminal and a second terminal;

said first terminal of said secondary winding of said transformer being electrically connected to said first electrode of said second electronic control device;

said second terminal of said second electronic control device being electrically connected to said first terminal of said second resistive means;

said second terminal of said second resistive means being electrically connected to said second terminal of said secondary winding of said transformer, whereby the electrical current flowing through said second resistive means depends solely on the frequency of an input signal applied by said input signal source to said first electronic control device;

a capacitor electrically connected between the first and second terminals of said secondary winding of said transformer;

third resistive means connected between the second terminal of said first resistive means and the first terminal of said second resistive means;

fourth resistive means connected in series with fifth resistive means such that the series-connected fourth and fifth resistive means shunts said source of electrical energy;

whereby the junction between said second and third resistive means constitutes a first output terminal of said frequency detection circuit, and the junction between said fourth and fifth resistive means constitutes a second output terminal of said frequency detection circuit.

7. A frequency detection circuit according to claim 6, wherein said first electronic control device consists of an input transistor, and said second electronic control device consists of a diode.

8. A frequency detection circuit according to claim 7, wherein said first, second and fourth resistive means consist of variable resistive elements, and said third and fifth resistive means consist of fixed resistive elements.

9. A frequency detection circuit according to claim 6, wherein said first electronic control device consists of an input transistor, said second electronic control device consists of a diode, and including a capacitor shunting said input transistor.

10. A frequency detection circuit according to claim 5, wherein said second and said first resistive means consist of variable resistive elements.

* * * * *